United States Patent
Phillips et al.

(10) Patent No.: US 6,877,313 B1
(45) Date of Patent: Apr. 12, 2005

(54) PARTICULATE CONTROL

(75) Inventors: Paul Richard Phillips, Royston (GB); Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/857,386

(22) PCT Filed: Nov. 29, 1999

(86) PCT No.: PCT/GB99/03971

§ 371 (c)(1),
(2), (4) Date: Sep. 4, 2001

(87) PCT Pub. No.: WO00/34632

PCT Pub. Date: Jun. 15, 2000

(30) Foreign Application Priority Data

Dec. 5, 1998 (GB) .............................. 9826748
Jun. 9, 1999 (GB) .............................. 9913300

(51) Int. Cl.$^7$ ................................. F01N 3/00
(52) U.S. Cl. .................. 60/297; 60/274; 60/286; 60/295; 60/301; 60/303; 422/170; 422/172; 422/177
(58) Field of Search .............. 60/274, 295, 286, 60/297, 300, 301, 302, 303; 422/169, 170, 171, 172, 177

(56) References Cited

U.S. PATENT DOCUMENTS

| | | | | |
|---|---|---|---|---|
| 5,398,503 A | * | 3/1995 | Danno et al. ............... 60/288 |
| 5,551,231 A | * | 9/1996 | Tanaka et al. .............. 60/289 |
| 5,743,087 A |   | 4/1998 | Zahn et al. |
| 5,746,989 A | * | 5/1998 | Murachi et al. .......... 423/213.7 |
| 5,884,473 A | * | 3/1999 | Noda et al. ................ 60/274 |
| 5,891,409 A | * | 4/1999 | Hsiao et al. .............. 423/239.1 |
| 6,038,854 A | * | 3/2000 | Penetrante et al. .......... 60/297 |
| 6,293,096 B1 | * | 9/2001 | Khair et al. ............... 60/286 |
| 6,484,495 B2 | * | 11/2002 | Minami ..................... 60/288 |

FOREIGN PATENT DOCUMENTS

| | | |
|---|---|---|
| DE | 33 37 903 | 5/1985 |
| EP | 0 341 832 | 11/1989 |
| EP | 0 749 774 | 12/1996 |
| EP | 0 758 713 | 2/1997 |
| EP | 0 835 684 | 4/1998 |
| GB | 2 188 559 | 10/1987 |

OTHER PUBLICATIONS

International Search Report dated Feb. 24, 2000.

British Search Report dated Jul. 13, 1999.

* cited by examiner

Primary Examiner—Binh Q. Tran
(74) Attorney, Agent, or Firm—RatnerPrestia

(57) ABSTRACT

An improved system for treating the aftertreatment of exhaust gases, especially from diesel engines, comprises a first catalyst (20) effective to oxidise hydrocarbons, a second catalyst (22) effective to convert NO to $NO_2$, a trap (24) for particulates, on which particulates may combust with the $NO_2$, and optionally a $NO_x$ absorption material (26).

46 Claims, 2 Drawing Sheets

PARTICULATE CONTROL

The invention concerns improvements in emissions control, especially from internal combustion engines such as diesel and other lean-burn engines.

Lean-burn engines present problems in that it is difficult to reduce $NO_x$ emissions in the presence of oxygen. Compression ignition ("diesel") engines and some types of gasoline engines emit combustible particulate ('soot"). Although engine design, fuelling strategies and devices such as exhaust gas recirculation can decrease engine-out, $NO_x$ levels, it remains difficult to decrease both NOx and soot to below modern limits, such as are expected to be prescribed in European Stage IV regulations.

The difficulty appears to be greater for low exhaust gas temperatures, for example resulting from engine design such as light duty turbo-charged direct injection diesel engines, especially if fitted with EGR, or from light duty generally.

However, there are a great many naturally aspirated diesel engines used throughout the world in vehicles, maritime craft and in stationary power sources. Although many modern engine designs utilise charging, there is a huge population of naturally aspirated engines, and this will be the case for the foreseeable future. Also, it is to be noted that in some countries, including particularly Japan, the performance enhancements from turbo-charging are not adjudged to be worthwhile, and indeed for some markets, turbochargers am removed from modern engines during truck or bus building or re-building. All diesel engines generate soot, but the soot from naturally aspirated engines is "wet" soot, that is it carries a considerable proportion of hydrocarbons absorbed into the particles. There are currently health concerns about the types of hydrocarbons absorbed on the soot. Although the present invention in another aspect has particular application to naturally aspirated diesel (compression ignition) engines, it may also find application in other engine designs which generate such particulates.

One particularly effective treatment for diesel exhaust is that marketed by Johnson Matthey PLC as the "Continuously Regenerating Trap" ("CRT"—RTM). In the CRT system as disclosed in EP-A-0341832 an oxidation catalyst converts NO in the exhaust to $NO_2$, the gas enriched with $NO_2$ is passed into a filter for the soot and the $NO_2$ causes facile combustion of the soot, thus continuously regenerating the filter and preventing blocking. The CRT is especially suited to so-called heavy-duty diesel engines as used in buses and larger trucks, where exhaust gas temperatures are generally relatively high.

In the case of turbo-charged direct injection engines used in light duty applications such as cars and light trucks, the exhaust gases are relatively cool, which with other factors makes the CRT system rather less effective than with heavy duty engines.

The invention provides a process of treating internal combustion engine exhaust gas containing $O_2$, NOx, unburnt hydrocarbon ("HC"), CO and soot, comprising:
i. oxidising a substantial part of the HC, with possibly some oxidation of NO to $NO_2$;
ii. treating the product of step i to oxidise NO to $NO_2$;
iii. collecting soot; and
iv. combusting the collected soot by reaction with the $NO_2$ and possibly any $O_2$ left over after steps i and ii.

The invention also provides a system for treating such internal combustion engine exhaust gas, comprising:
a first catalyst to receive engine exhaust gas and effective to promote oxidation of inter alia HC therein;
a second catalyst receiving the product of the first catalyst and effective to promote oxidation of NO to $NO_2$;
a filter effective to collect soot and retain it until combusted by said $NO_2$ and possibly any $O_2$ left over after the first and second catalyst.

Since the gas contains soot, the first and second catalysts are suitably supported on a structure permitting passage of fine solid particles. The structure preferably provides through passages, for example in a honeycomb having at least 50, possibly more, the range 100–900 cells/inch$^2$ being generally preferred, more preferably 100 to 400 cells/in$^2$. The honeycomb may be composed structurally of ceramic or metal. Such ceramic may be for example alumina, silica, titania, zirconia or combinations such as example cordierte or silicon carbide. Such metal may be for example a refractory steel for example Fecralloy. Such metal may make it practicable to provide more passages per square inch, eg up to 1200. Alternative monolithic supports are available, and it is intended to include static fluid mixers and the like, as required and subject to routine testing.

The support structure carries a coating ('washcoat') of high-surface support material for catalytically active components. For the first catalyst the coating and these components are chosen so that it is effective to remove substantially all the HC. (It will normally also effect oxidation of CO to $CO_2$ and, to some extent, of NO to $NO_2$). We believe, although we do not wish to be confined to such belief, that removing gaseous HC before oxidising NO to $NO_2$ removes species inhibiting such NO oxidation. Although part of the NO may be converted to $NO_2$ over the first catalyst, unconverted NO is more effectively converted over the second catalyst. In the second embodiment of the present invention, HC absorbed on "wet" soot is combusted over the first catalyst.

An effect of the first catalyst can be to increase the temperature at the inlet of the second catalyst to a level at which the velocity of NO to $NO_2$ conversion is sufficient to provide more $NO_2$: the subsequent soot combustion reactions are also then faster. The resulting temperature should not of course be in a range at which $NO_2$ formation is equilibrium limited.

In the first embodiment of the invention, it is desirable to obtain an adequate reaction rate over the first catalyst for the reaction of gaseous HC; its inlet temperature is preferably maximised by disposing that catalyst as close as possible to the engine outlet. Thus it is typically mounted in the cylinder block region, for example on the exhaust gas manifold before or after a turbo-charger if used. To attain or increase such temperature rise, additional fuel eg diesel fuel, may be dosed upstream of the first catalyst and oxidised thereon. Alternatively or additionally, the engine inlet fuel injection profile may be adjusted to increase the HC, or more conveniently the CO, content of the raw exhaust gas. Preferably such measures to increase gas temperature continue to provide a lean gas composition. Enrichment with HC and/or CO may be continuous or, preferably, intermittent and initiated upon the detection of appropriate exhaust gas conditions. However attained, the temperature at the outlet of the first catalyst stage is preferably at least 200°, and eg up to 500° C.

Preferably the first catalyst has a very low light-off temperature for both the CO and HC oxidation reactions. This is an additional benefit during parts of the engine operating cycle in which exhaust gas temperatures are temporarily low, eg during idle.

In the second embodiment, the first catalyst contains a component capable of oxidising hydrocarbons of the type absorbed on wet soot. Suitable forms of ceria are particularly indicated, and such catalysts may comprise other components, as well as preferably one or more platinum group metal catalyst dispersed on an oxide support, which in turn is desirably carried on a monolithic catalyst support.

A particularly preferred first catalyst for the second embodiment comprises platinum dispersed on ceria, or on a metal oxide washcoat which incorporates ceria. The platinum loading may be up to 200 g/cuft. Other catalytic or promoting elements may also be present. The ceria may be present as a washcoat over a platinum-catalysed alumina or over another catalyst.

Whereas the second catalyst may have the same composition as the first, it is suitably designed to be more effective for the NO to $NO_2$ reaction, and the temperature and/or space velocity, for example, may be different as between the two catalysts. Thus the conditions for the HC oxidation and NO oxidation may be independently optimised. The temperature in the second catalytic step is preferably in the range 150 to 350° C. (Since oxidation of NO is not strongly exothermic, there is little difference between inlet and outlet temperatures).

In the catalysts the active material comprises generally a platinum group metal ("PGM"), especially platinum and/or palladium, optionally with others eg rhodium. The exact composition of the catalyst is chosen to suit local requirements. Desirably they have relatively high (eg 10–150 g/ft$^3$) loadings of platinum, and optionally may have other catalyst components such as rhodium or palladium or catalyst promoter compounds.

The soot filter may be any capable of collecting the soot without causing excessive back-pressure. Its detailed specification is chosen according to the particular engine characteristics and the regulations to be met. It may be a ceramic wall flow filter, a ceramic foam filter, ceramic fibre filter, sintered metal or wire mesh filter of any suitable type. It may provide for removal of 50 to 100%, preferably at least 604/e, more preferably 85%, or greater, of the measured soot in the exhaust gas. There may be a fail-safe bypass or a two-stage filter to cater for a situation where the filter would otherwise be blinded or blocked under certain engine operating conditions. If desired, the filter may be catalysed or part-catalysed to assist combustion. A variety of catalysts are known to be suitable, and these include one or more oxides of vanadium, cerium, and mixed Cs/La/V oxide and supported PGMs. The invention includes the possibility of initiating combustion of the soot if required, for example if the engine operating conditions are such that considerable soot is being/has been generated but the gas temperatures are rather too low for significant combustion; for example initiation may be by providing electric heating of a portion of the filter. The soot is generally carbon and/or heavy hydrocarbons, and is converted to carbon oxides and steam.

It is desirable to use low sulphur-content diesel fuel, suitably below 50 ppms, and more preferably "ULSD" or ultra-low sulphur diesel of 10 ppms or lower.

The invention provides also an engine in combination with a system as herein defined and a process of operating such an engine.

In this combination, in the first embodiment the first catalyst may be disposed close to the source of exhaust gas, to obtain a maximum convenient operating temperature and reaction rate therein. The outlet gas from that catalyst may undergo cooling, for example in a non-insulated or finned pipe, before entering the second catalyst.

In the combination of the second embodiment, the first catalyst is suitably disposed close to, desirably in, the same housing or "can", as the second catalyst and the filter. It is possible to contemplate a single catalyst monolith or "brick", one end of which carries the first catalyst, and the other end of which carries the second catalyst, providing appropriate catalyst design and catalyst manufacturing technology is used, and providing that gas flow rates and space velocities are suitable.

The combination may include expedients such as EGR.

The combination may include sensors for at least one of: fuel composition; air/fuel ratio at engine inlet; exhaust gas compositions at critical stages; pressure drop. If engine inlet adjustment and/or fuel injection is used, then a temperature sensor after the first catalyst, and possibly before that catalyst and/or at the inlet of the NO oxidation catalyst are preferably provided. The control system may include also indicator means informing the engine operator, computer means effective to evaluate the data from the sensor(s), and control linkages effective to adjust the engine to desired operating conditions taking account of eg start-up, varying load and chance fluctuations, and to inject fuel into the exhaust gas if desired.

Preferably the engine is a diesel engine, although other engines, including direct injection gasoline engines, may also benefit from the invention. The engine may be the motive power for a vehicle, or may be a stationary power source or auxiliary power source. Most usefully the first embodiment is applied to a light duty engine as defined above, especially powering a passenger car or light truck or van. Generally "light" means less than 3500 kg unladen weight. This may typically correspond to a cylinder capacity up to 6.0 liters and a power output up to 300 KW. The invention is potentially of value for engine for other duties. Desirably, the second embodiment is applied to "heavy duty diesel" engines.

It is believed, although we do not wish to be restricted by any theory, that the system and process of preferred embodiments of the invention, whilst permitting combustion of hydrocarbons in the first zone, generates sufficient $NO_2$ in the second zone to provide the right balance of $NO_2$ to carbon for combustion in the particular trap, under typical diesel operating conditions.

If desired, the present invention may be combined with additional means to reduce $NO_x$ in the gases leaving the system of the invention, which may include one or both of $NO_x$ reduction catalysts, including catalysts of the three-way type or systems incorporating reductant addition and a suitable catalyst, and a regenerable absorber. Such means are generally known.

The first embodiment of the invention is illustrated with reference to the accompanying drawings, in which.

Figure 1:
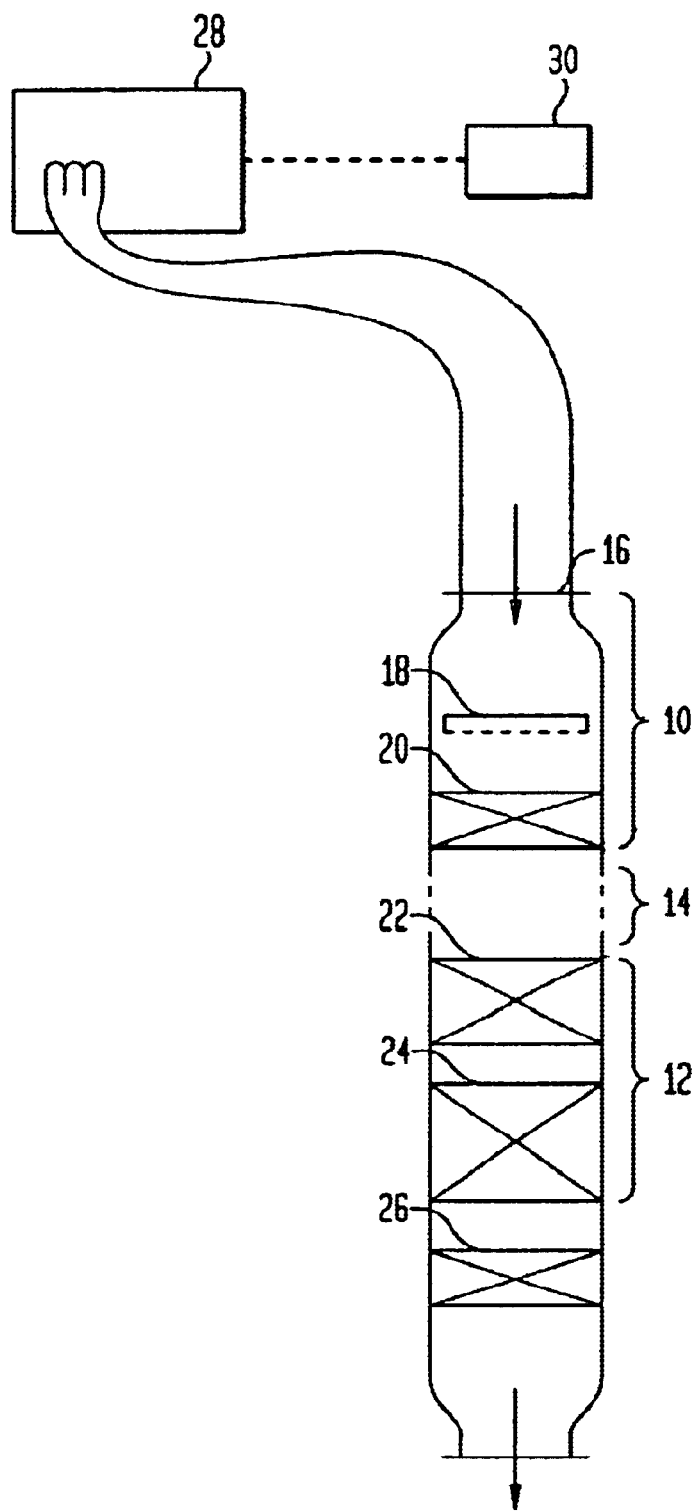
FIG. 1 is a schematic drawing of a system according to the invention.

Referring to FIG. 1, a light-duty turbo-charged direct-injection diesel engine 28 discharges its exhaust, containing inter alia HC and soot, into a system comprising reactors 10 and 12, connected together for gas flow at region 14. Region 14 is shown by pecked lines to indicate that the connection may be short or may be relatively long, for example with reactor 10 at the engine outlet and reactor 12 under the vehicle body. Such a long connection may itself provide cooling or may include a finned region. Reactor 10 optionally includes at its inlet 16 the sparging spray injector 18. It essentially includes bed 20, of catalyst primarily for oxidation of HC and CO, the HC content of the gas entering bed 20 being HC exhausted by the engine, possibly augmented by HC injected at 18. Control means 30 responsive to the temperature of the gas leaving bed 20 regulates engine inlet conditions and HC injection at 18, to keep the temperature of bed 20 high enough for sufficiently rapid HC oxidation.

Reactor 12 contains at its inlet the bed 22 of catalyst primarily for oxidation of NO to $NO_2$. The gas leaving bed 22, enriched in $NO_2$, passes into soot filter 24, where soot is trapped and oxidised by reaction with the $NO_2$ and $O_2$. Beds 22 and 24 constitute a "CRT" system. The gas, now substantially soot-free, may pass out to atmosphere if air quality regulations permit. Optionally the system may include, in the same reactor or possibly in a separate one, bed 26, charged with NOx absorption material, possibly with an injector (not shown) for reductant or ammonia between 24 and 26, and possibly with a catalyst for reduction of NOx to $N_2$.

Each bed in the system is in the form of a ceramic honeycomb, with (except filter 24) an alumina washcoat carrying active material.

EXAMPLE 1

A synthetic exhaust gas of the following composition v/v was used:

| | |
|---|---|
| $CO_2$ | 4.5% |
| $H_2O$ | 4.5% |
| $O_2$ | 12.0% |
| CO | 200 ppm |
| NO | 400 ppm |
| $C_3H_6$ | 0 or 400 ppm or 800 ppm |
| $N_2$ | balance. |

Figure 2:
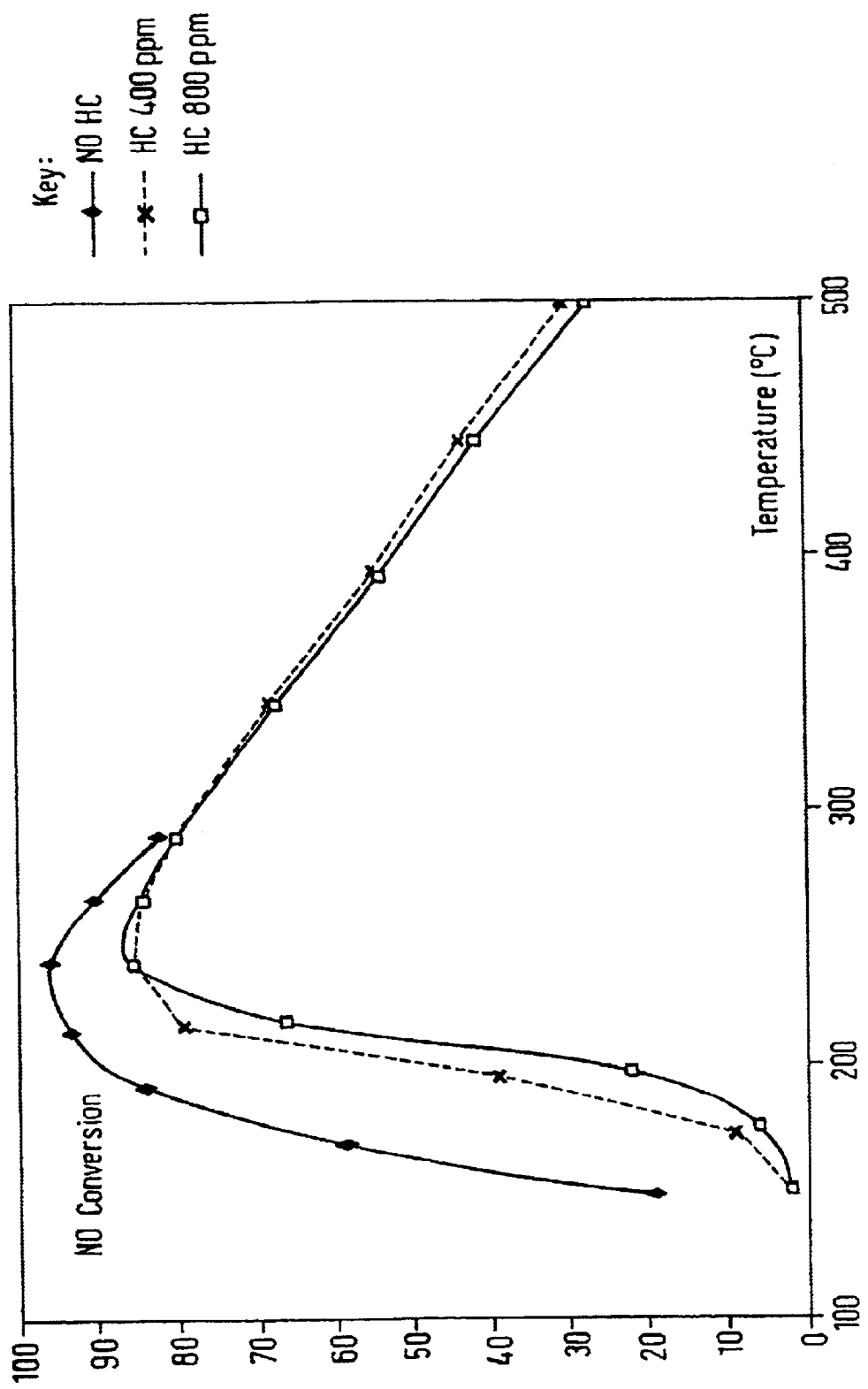
FIG. 2 is a graph comparing the conversions of NO to $NO_2$ in the presence of HC (prior art) and absence of HC (invention).

This was passed over a 1% w/w platinum on gamma alumina catalyst in particle form in a laboratory reactor at temperatures between 150° C. and 500° C. This reactor is known to represent a typical exhaust catalyst consisting of platinum on an alumina washcoat on a honeycomb. The compositions of the outlet gas are shown in FIG. 2.

The plots for gas containing 400 ppm and 800 ppm HC (propylene) show there is very little conversion below about 200° C. However, in the absence of hydrocarbon (as removed in bed 20), already there is 20% conversion at 150° C. and 85% conversion at 200° C. It is evident that once the HC (represented by $C_3H_6$) has been removed in the first oxidation step the oxidation of NO to $NO_2$ can take place more completely, affording more $NO_2$ for the combustion of particulate in the subsequent step of CRT. Bearing in mind the cool exhaust gas temperatures met with in modern light duty diesel engine designs, the significantly improved conversion at temperatures below 200° C. resulting from the removal of gaseous HC, is particularly useful.

EXAMPLE 2

The exhaust of a 4 cylinder turbo-charged direct injection Diesel engine of 2.5 liter capacity with EGR and operated at an air-fuel weight ratio of about 30 was fed to the first of 2 catalytic stages of a system as shown in FIG. 1 of the drawings. The inlet exhaust gas composition v/v was:

| | |
|---|---|
| $CO_2$ | 5.0% |
| $H_2O$ | 4.9% |
| $O_2$ | 13.0% |

-continued

| | |
|---|---|
| CO | 800 ppm |
| NO | 100 ppm |
| $N_2$ | balance |

Catalysts 20 and 22 comprised platinum group metal supported on an alumina-containing washcoat on a 400 cpsi cordierite honeycomb. Catalyst 20 was mounted just outside the engine exhaust manifold after the turbo-charger catalyst 22 was 1.01 m downstream in an underfloor position. For some runs this was adjusted by injection of Diesel fuel using sparger 18, giving a lower but still lean air/fuel ratio. Comparative runs were carried out using at 20 another sample of the same washcoated honeycomb but without catalytic material. Runs were made at a range of load levels, giving temperatures in the range of 225° to 325° C., measured at 22 inlet. The outlet gas was analysed for NO, and total NOx and $NO_2$ calculated by difference. The table shows the concentration of NO and $NO_2$ at representative temperatures.

| Temp° C. | | 225° | | 275° | | 325° | |
|---|---|---|---|---|---|---|---|
| Noxide | | NO | $NO_2$ | NO | $NO_2$ | NO | $NO_2$ |
| No Fuel | Cat | 82 | 5 | 78 | 36 | 68 | 63 |
| | Non-cat | 96 | 1 | 80 | 18 | 70 | 54 |
| +Fuel | Cat | 71 | 3 | 73 | 33 | 84 | 42 |
| | Non-cat | 65 | 3 | 78 | 26 | 88 | 36 |

It is evident that, except at the lowest temperature in presence of added fuel, the use of the first stage catalyst gives a significantly higher concentration of $NO_2$, thus providing for more efficient combustion of collected soot on filter 22.

The second embodiment of the invention is now exemplified below. A variety of typical oxide catalyst supports, in particulate form, were impregnated with Pt at the wt % shown in Table 1, using aqueous solution of Pt salts, by the incipient wetness technique. The powdered samples were dried in air at 90° C. All samples were then calcined at 500° C. for 3 hours in air.

The samples were impregnated with standard commercial diesel engine lubricating oil at 10 wt % per sample, and physically mixed to absorb the oil. Thermo-Gravimetric Analysis and Differential Thermal Analysis was performed on approx 40 mg samples using a STA 1500 machine using an air atmosphere, at a ramp rate of 10° C./min, The temperature of onset of combustion was determine and the area under the DTA peak (expressed on a time basis, and normalised for sample weight) gives a relative measure of the oil combusted versus oil volatilisation. A TGA/DTA plot of a sample of the lubrication oil showed that volatilised occurred between ca 240 and 400° C., and that combustion occurred above ca. 400° C. The results for ceria and γ-alumina are shown below in Table 1.

TABLE 1

| Exp | Sample | Pt-loading (Wt %) | DTA Onset Temp (° C.) | DTA Peak Area ($\mu$V-S/mg sample) |
|---|---|---|---|---|
| 1 | Y-alumina | 0.0 | 226 | 1098 |
| 2 | Y-alumina | 0.25 | 209 | 1108 |

TABLE 1-continued

| Exp | Sample | Pt-loading (Wt %) | DTA Onset Temp (° C.) | DTA Peak Area ($\mu$V-S/mg sample) |
|---|---|---|---|---|
| 3 | ceria | 0.0 | 134 | 2104 |
| 4 | ceria | 0.009 | 138 | 2165 |
| 5 | ceria | 0.0375 | 140 | 2125 |
| 6 | ceria | 0.25 | 132 | 2361 |

It can be seen that both samples of γ-alumina have a relatively high DTA onset temperature, but all samples of ceria show a very significant reduction, into the range of temperatures commonly met with in diesel exhaust gases. All the ceria-based tests illustrate significant combustion of the hydrocarbon oil at low temperatures.

Additional tests were carried out in essentially the same manner, but using mixtures of ceria and platinum catalysed γ-alumina, with one or both of the ceria and alumina impregnated with 10 wt % of oil. The results are shown in Table 2 below:

TABLE 2

| No. | Sample | Pt($Al_2O_3$) Loading (wt %) | DTA Onset Temp (° C.) | DTA Peak Area |
|---|---|---|---|---|
| 1 | Ceria$^{OIL}$/alumina | 0.25 | 147 | 1182 |
| 2 | Ceria/alumina$^{OIL}$ | 0.25 | 159 | 1147 |
| 3 | Ceria$^{OIL}$/alumina$^{OIL}$ | 0.25 | 156 | 1355 |
| 4 | (ceria/alumina_$^{OIL}$ | 0.25 | 148 | 1915 |

The beneficial effect of the presence of ceria can be seen in all samples.

What is claimed is:

1. A process of treating internal combustion engine exhaust gas containing $O_2$, NOx, unburnt hydrocarbon ("HC"), CO and soot, comprising the steps of:
   i. contacting the engine exhaust gas with a first catalyst adapted to be fed with the engine exhaust gas and effective to promote oxidation of HC, to oxidize a substantial part of the HC;
   ii. contacting the engine exhaust gas that has passed over the first catalyst with a second catalyst effective to promote the catalytic oxidation of NO to $NO_2$, to oxidize NO to $NO_2$;
   iii. collecting soot on a filter adapted to be fed with the engine exhaust gas that has passed over the first and second catalysts; and
   iv. combusting the collected soot by reaction with the catalytically oxidized $NO_2$ and $O_2$.

2. A process according to claim 1, wherein the first and second catalysts are honeycomb-supported.

3. A process according to claim 2, wherein the honeycomb defines cells having a cell density in the range of 100–900 per square inch.

4. A process according to claim 1, further comprising the step of cooling the engine exhaust gas leaving the first catalyst and before the engine exhaust gas contacts the second catalyst.

5. A process according to claim 1, wherein the step of contacting the exhaust gas with a first catalyst to oxidize a substantial part of the HC is carried out close to the source of the engine exhaust gas, whereby a maximum convenient operating temperature and reaction rate is obtained.

6. A process according to claim 4, further comprising the step of providing an increased amount of a combustible upstream of the first catalyst to increase the temperature at which step i operates.

7. A process according to claim 6, wherein the combustible is provided by modifying engine settings to pass more HC and/or generate more CO.

8. A process according to claim 1, wherein the first catalyst has a very low light-off temperature for HC and CO oxidation.

9. A process according to claim 1, wherein the HC is absorbed on the soot.

10. A process according to claim 1, further comprising the step of removing NOx downstream of the step of combusting the collected soot.

11. A process according to claim 10, wherein the step of removing NOx is through a regenerable NOx absorber.

12. A process according to claim 11, further comprising the step of catalytically removing NOx downstream from the NOx absorber.

13. A system for treating internal combustion engine exhaust gas containing $O_2$ NOx, unburnt hydrocarbon ("HC"), CO, and soot, comprising:
   i. a first catalyst adapted to receive the engine exhaust gas and effective to promote oxidation of HC therein for oxidizing a substantial part of the HC;
   ii. a second catalyst adapted to receive the engine exhaust gases that have passed over the first catalyst and disposed downstream of the first catalyst, the second catalyst effective to promote oxidation of NO to $NO_2$; and
   iii. a filter adapted to receive the engine exhaust gases that have passed over the first and second catalysts, the filter effective to collect and retain soot for combustion by reaction with the $NO_2$ and the $O_2$.

14. The system according to claim 13, wherein the first and second catalysts are honeycomb-supported.

15. The system according to claim 14, wherein the honeycomb defines cells having a density in the range of 100–900 per square inch.

16. The system according to claim 13, wherein the internal combustion engine is a diesel engine.

17. The system according to claim 16, wherein the diesel engine is designed for light duty applications.

18. The system according to claim 17, wherein the diesel engine is a turbo-charged direct injection type.

19. The system according to claim 16, wherein the diesel engine is a heavy duty engine.

20. The system according to claim 13, wherein the first catalyst is positioned close to the second catalyst.

21. The system according to claim 13, wherein the first catalyst and the second catalyst are at opposite ends of a single catalyst monolith.

22. A process according to claim 1, wherein the step of oxidizing a substantial part of the HC over a first catalyst further comprises oxidizing some NO to $NO_2$.

23. A process according to claim 1, wherein the first catalyst comprises at least one supported platinum group metal (PGM).

24. A process according to claim 23, wherein the at least one supported PGM is selected from the group consisting of platinum, palladium and rhodium.

25. A process according to claim 24, wherein the at least one PGM is platinum and palladium.

26. A process according to claim 24, wherein the support is selected from the group consisting of alumina, ceria and alumina and ceria.

27. A process according to claim 25, wherein the support is selected from the group consisting of alumina, ceria and alumina and ceria.

28. A process according to claim 1, wherein the first catalyst comprises a first layer comprising platinum-catalyzed alumina and a second layer comprising ceria overlying the first layer.

29. A process according to claim 23, wherein the at least one supported PGM comprises from 10–150 g/ft$^3$ platinum.

30. A process according to claim 1, wherein the second catalyst comprises at least one supported platinum group metal (PGM).

31. A process according to claim 30, wherein the at least one supported PGM is selected from the group consisting of platinum, palladium and rhodium.

32. A process according to claim 31, wherein the at least one PGM is platinum.

33. A process according to claim 30, wherein the support is alumina.

34. A process according to claim 32, wherein the at least one PGM comprises from 10–150 g/ft$^3$ platinum.

35. The system according to claim 13, wherein the first catalyst comprises at least one supported platinum group metal (PGM).

36. The system according to claim 35, wherein the at least one supported PGM is selected from the group consisting of platinum, palladium and rhodium.

37. The system according to claim 36, wherein the at least one PGM is platinum and palladium.

38. The system according to claim 36, wherein the support is selected from the group consisting of alumina, ceria and alumina and ceria.

39. The system according to claim 37, wherein the support is selected from the group consisting of alumina, ceria and alumina and ceria.

40. The system according to claim 36, comprising a first layer comprising platinum-catalyzed alumina and a second layer comprising ceria overlying the first layer.

41. The system according to claim 36, comprising from 10–150 g/ft$^3$ platinum.

42. The system according to claim 13, wherein the second catalyst comprises at least one supported platinum group metal (PGM).

43. The system according to claim 42, wherein the at least one supported PGM is selected from the group consisting of platinum, palladium and rhodium.

44. The system according to claim 43, wherein the at least one PGM is platinum.

45. The system according to claim 42, wherein the support is alumina.

46. The system according to claim 44 comprising from 10–150 g/ft$^3$ platinum.

* * * * *